Feb. 28, 1950  W. H. SAUER  2,498,966
ADJUSTABLE AUTO VISOR EXTENSION
Filed March 11, 1948
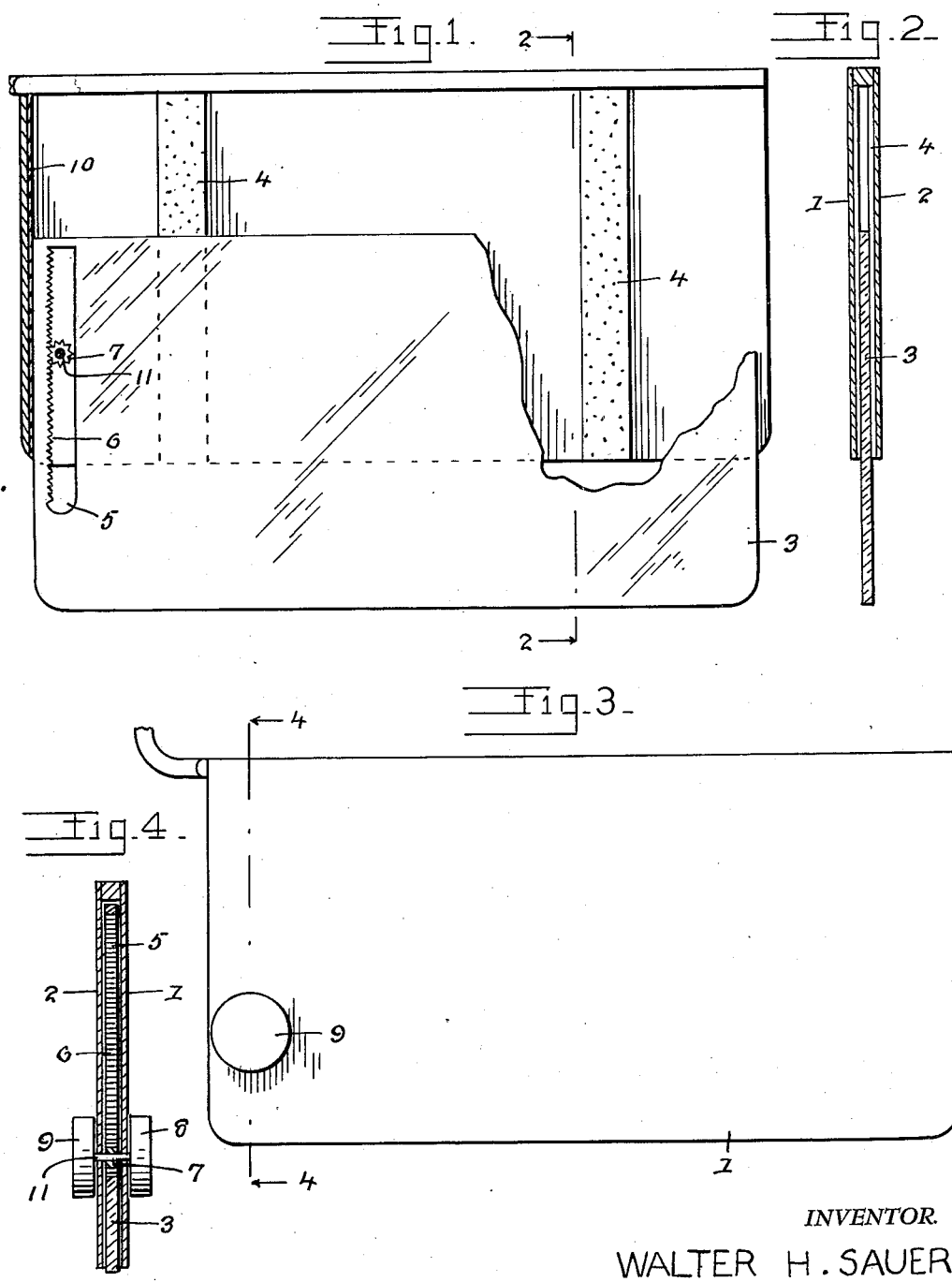
INVENTOR.
WALTER H. SAUER
BY *Victor J. Evans & Co.*
ATTORNEYS Patented Feb. 28, 1950

2,498,966

UNITED STATES PATENT OFFICE 2,498,966

ADJUSTABLE AUTO VISOR EXTENSION

Walter H. Sauer, Fowler, Colo.

Application March 11, 1948, Serial No. 14,373

2 Claims. (Cl. 160—37)

This invention relates to improvements in visors for use on automobiles.

It is well known that when the sun is low and when facing glaring headlights on an approaching automobile, the usual visor is useless since it is opaque and when lowered to a position to exclude the glare it blocks the forward view entirely.

It is therefore an object of this invention to provide an extension for a visor which can be readily adjusted to any desired position to eliminate the glare of the sun or the headlights of an approaching automobile.

A further object is to provide an extension for a visor which is made of non-glare glass or tinted plastic glass, which slides up and down inside of a visor.

These and other objects are attained by the novel construction and arrangement of parts hereinafter described and illustrated by the accompanying drawings, forming a part hereof, and in which:

Fig. 1 is a rear view of a visor with extension embodying the invention, the extension being lowered.

Fig. 2 is a sectional view taken on the line 2—2 of Fig. 1.

Fig. 3 is a front view of the visor with the extension raised.

Fig. 4 is a sectional view taken on the line 4—4 of Fig. 3.

Referring to the drawings, the visor device is shown to comprise a visor of the usual type having spaced walls 1 and 2, between which is positioned a sheet 3 of non-glare glass or tinted plastic glass. The walls 1 and 2 are provided with strips 4 of felt or the like to prevent rattling and to hold the adjustment of the glass 3.

At one side thereof, the glass 3 is provided with a slot 5, having mounted on one side thereof a rack 6 which engages a pinion 7, connected to knobs 8 and 9 so that the pinion can be rotated from the front or rear of the visor. At the side of the visor adjacent the rack and pinion is a flat surface 10 against which the glass 3 bears.

In use, the glass 3 can be raised or lowered to desired positions by rotating the pinion 7. The lowered glass 3 does not obscure the vision and at the same time eliminates the glare of a low sun or approaching headlights. The glass 3 can be adjusted to cover almost any situation.

The pinion 7 and knobs 8 and 9 are mounted on a pin 11, supported by the walls of the visor.

The device is neat and compact, simple in application, and capable of being manufactured at a low cost. It can also be used when turned to the side for protection.

The above description is to be considered as illustrative and not limitative of the invention of which modifications can be made without departing from the spirit and scope of the invention as set forth in the appended claims.

The invention having been described, what is claimed is:

1. In combination with a visor having a pair of spaced walls, an extension of non-glare transparent material, strips on the walls of the visor engaging the extension to prevent rattling and to maintain adjustment thereof, said extension having a slot with a rack positioned therein, a shaft supported for rotation by the walls of the visor, having a pinion affixed thereto engaging the rack, knobs affixed to the shaft at opposite sides of the visor for rotating the shaft and pinion, and a flat surface on the visor against which the extension bears and is guided by in its movement.

2. In combination with a visor having a pair of spaced walls, an extension of non-glare transparent material, means on at least one wall of the visor engaging the extension for preventing rattling and to maintain adjustment thereof, said extension having a slot with a rack positioned therein, a shaft supported for rotation by the walls of the visor, having a pinion affixed thereto engaging the rack, knobs affixed to the shaft at opposite sides of the visor for rotating the shaft and pinion, and a flat surface on the visor against which the extension bears and is guided by in its movement.

WALTER H. SAUER.

REFERENCES CITED

The following references are of record in the file of this patent:

UNITED STATES PATENTS

| Number | Name | Date |
|---|---|---|
| 2,358,173 | McFadyen | Sept. 12, 1944 |
| 2,422,863 | Stroth | June 24, 1947 |
| 2,458,918 | Rea | Jan. 11, 1949 |